United States Patent
Theile et al.

(10) Patent No.: US 11,642,740 B2
(45) Date of Patent: May 9, 2023

(54) IDENTIFYING SMOKE EVENTS AND ELECTRON BEAM MELTING INSTALLATION

(71) Applicant: Siemens Aktiengesellschaft, Munich (DE)

(72) Inventors: Oliver Theile, Berlin (DE); Jan Drendel, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 152 days.

(21) Appl. No.: 17/111,782

(22) Filed: Dec. 4, 2020

(65) Prior Publication Data

US 2021/0170518 A1    Jun. 10, 2021

(30) Foreign Application Priority Data

Dec. 4, 2019  (EP) .................................... 19213569

(51) Int. Cl.
| | |
|---|---|
| B33Y 50/02 | (2015.01) |
| B23K 15/02 | (2006.01) |
| B33Y 10/00 | (2015.01) |
| B33Y 30/00 | (2015.01) |
| G05B 13/02 | (2006.01) |
| B23K 15/00 | (2006.01) |

(52) U.S. Cl.
CPC .............. *B23K 15/02* (2013.01); *B33Y 10/00* (2014.12); *B33Y 30/00* (2014.12); *B33Y 50/02* (2014.12); *G05B 13/027* (2013.01); *B23K 15/0086* (2013.01)

(58) Field of Classification Search
CPC ..................................................... B33Y 50/02
See application file for complete search history.

(56) References Cited

U.S. PATENT DOCUMENTS

| | | | |
|---|---|---|---|
| 2008/0252473 A1 | 10/2008 | Fink | .............................. 340/629 |
| 2009/0173443 A1 | 7/2009 | Kozlak | |
| 2017/0341141 A1 | 11/2017 | Ackelid | |
| 2018/0194080 A1 * | 7/2018 | El-Siblani | .............. B33Y 50/02 |
| 2018/0339341 A1 * | 11/2018 | Tatsumi | ................ B22F 10/366 |
| 2020/0167648 A1 * | 5/2020 | Siegl | ...................... A43B 13/00 |
| 2020/0269345 A1 | 8/2020 | Yamada | |
| 2020/0306867 A1 * | 10/2020 | Shion | ..................... B33Y 50/00 |
| 2020/0331090 A1 * | 10/2020 | Larouche | .............. B29C 64/393 |

FOREIGN PATENT DOCUMENTS

| | | | | |
|---|---|---|---|---|
| CN | 203275585 U | * | 11/2013 | |
| EP | 2 764 353 | | 9/2015 | ............. G08B 17/11 |
| EP | 3381659 A1 | * | 10/2018 | ............ B22F 3/1055 |
| KR | 102157874 B1 | * | 9/2020 | |
| WO | 2019 136523 | | 7/2019 | ........... B29C 64/141 |
| WO | 2019 088091 | | 7/2020 | .............. B22F 3/105 |

OTHER PUBLICATIONS

Search Report for EP Application No. 19213569.7, 5 pages, dated Apr. 3, 2020.

* cited by examiner

*Primary Examiner* — Suresh Suryawanshi

(74) *Attorney, Agent, or Firm* — Slayden Grubert Beard PLLC

(57) ABSTRACT

Various embodiments of the teachings herein include an apparatus for identifying a smoke event in an electron beam melting installation comprising: a current meter measuring a grounding current; and a processor programmed to identify a smoke event by evaluating the grounding current.

12 Claims, 2 Drawing Sheets

IDENTIFYING SMOKE EVENTS AND ELECTRON BEAM MELTING INSTALLATION

CROSS-REFERENCE TO RELATED APPLICATIONS

This application claims priority to EP Application No. 19213569.7 filed Dec. 4, 2019, the contents of which are hereby incorporated by reference in their entirety.

TECHNICAL FIELD

The present disclosure relates to electron beam melting installations. Various embodiments of the teachings herein include apparatuses for identifying a smoke event, installations, and/or methods for operating an electron beam melting installation.

BACKGROUND

Apparatuses for identifying smoke events are used in an electron beam melting installations, for example. Electron beam melting is an additive manufacturing technology in which successive powder layers are melted selectively in each case in order to build up a body to be manufactured layer by layer and additively. In the special case of electron beam melting, it can happen that the powder particles become charged with electric charge supplied by the electron beam in the form of electrons. This effect is based primarily on the high electrical resistance of the powder bed.

If the electric charge of the individual powder particles becomes too high, then the powder particles mutually repel one another. If the gravitational force or the adhesive force between the powder particles is exceeded in the process, then the particles can abruptly lift up out of the powder bed, which both destroys the powder layer and distributes powder particles in the process chamber space. If the powder particles independently change their position by account of the electric charge taken up by them and/or spread in the process chamber space, then this is also referred to as a so-called smoke event.

The designation smoke herein refers to the powder particles distributed in the chamber, which have a similar appearance to a cloud of smoke that forms above the powder bed. These smoke events are extremely undesirable since the electron beam can be deflected by particles distributed in the process chamber and the originally uniform powder layer then no longer has a uniform form and, consequently, the present layer cannot be applied or melted in accordance with the process.

SUMMARY

The teachings of the present disclosure describe an apparatus which makes it possible better to predict such smoke events or to identify them in an automatable manner. For example, some embodiments include an apparatus (100) for identifying a smoke event (SE) in an electron beam melting installation (10), comprising a current measuring device (150) configured for detecting a grounding current (IG), and an evaluation unit (160) configured for identifying a smoke event (SE) by evaluating the grounding current (IG).

In some embodiments, the evaluation unit (160) is configured for evaluating a time profile of the grounding current (IG) for identifying a smoke event (SE).

In some embodiments, the evaluation unit (160) is configured for evaluating a frequency profile of the grounding current (IG) for identifying a smoke event (SE).

In some embodiments, the evaluation unit (160) is configured for identifying a smoke event (SE) depending on an electron beam current (IB).

In some embodiments, the current measuring device (150) is configured for detecting the grounding current (IG) with a sampling frequency of at least one, in particular at least 10, 20 or 50 kHz.

In some embodiments, the evaluation unit (160) comprises at least one trained artificial neural network (165), which evaluates the grounding current (IG) and optionally the electron beam current (IB) as input variable and outputs an occurrence of a smoke event (SE) as output variable.

In some embodiments, the current measuring device (150) comprises a measuring resistor (R1), which is safeguarded in particular by means of at least one overvoltage protection apparatus (GDT1, GDT2).

In some embodiments, the current measuring device (150) is configured for detecting the grounding current (IG) on a grounding line (145).

As another example, some embodiments include an electron beam melting installation (10) comprising an apparatus (100) as described herein.

In some embodiments, there is a controller (170) configured for controlling an electron beam source (120) on the basis of an identified smoke event (SE).

In some embodiments, the controller (170) is configured for controlling the electron beam source (120) such that the smoke event (SE) is prevented and/or ended.

In some embodiments, the apparatus (100) is arranged within a grounded housing (180) of the electron beam melting installation (100).

As another example, some embodiments include a method for operating an electron beam melting installation (10), wherein a component (1) is produced in a powder bed (130) by means of an electron beam (125), comprising evaluating a grounding current (IG) for identifying a smoke event (SE) and reducing an electron beam current (IB) upon an upcoming and/or existing smoke event (SE) being identified.

BRIEF DESCRIPTION OF THE DRAWINGS

The teachings are described and explained in greater detail below on the basis of the exemplary embodiments illustrated in the figures, in which.

DETAILED DESCRIPTION

Figure 1:
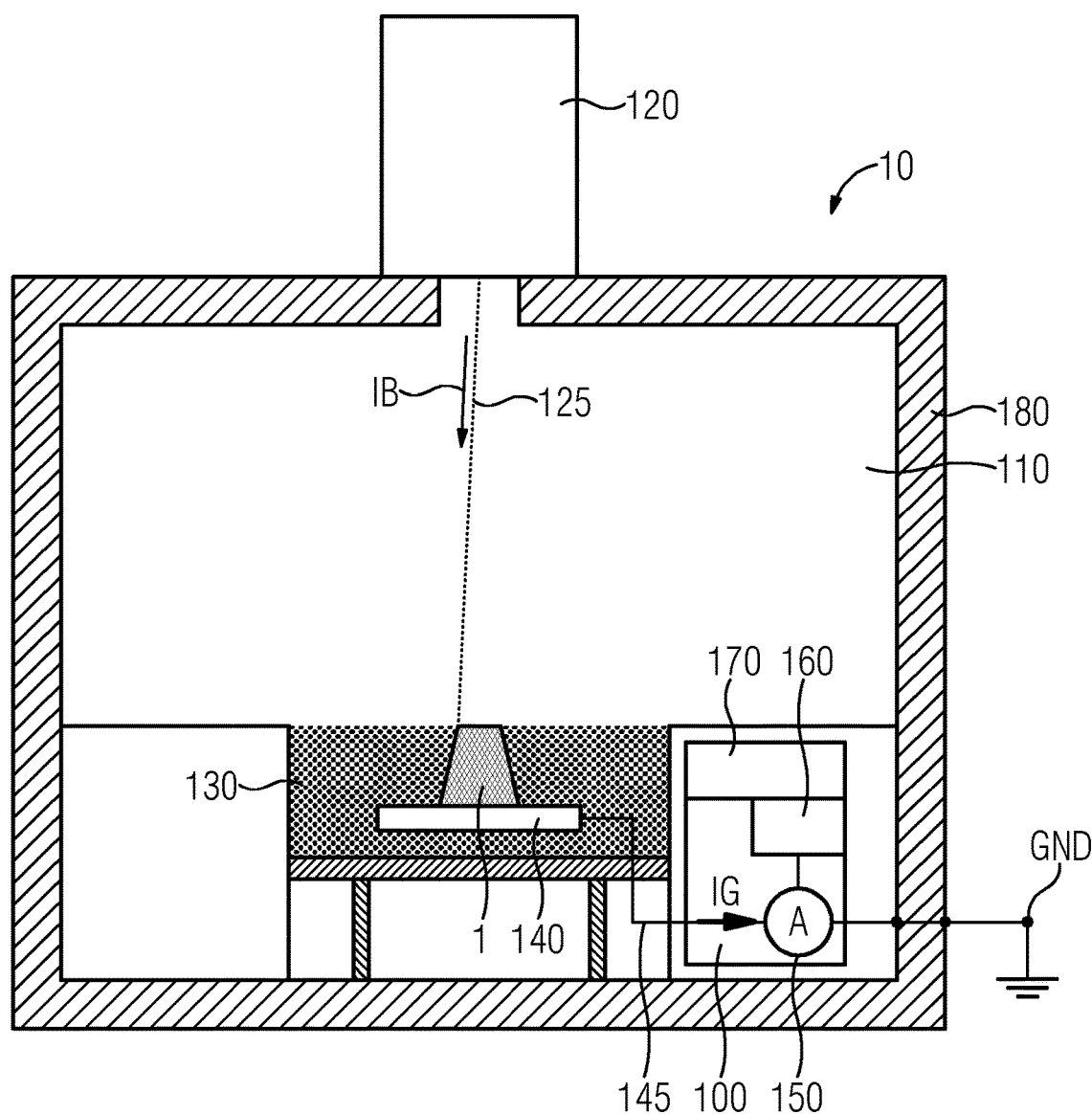
FIG. 1 shows one embodiment of an electron beam melting installation with an apparatus incorporating teachings of the present disclosure.

In some embodiments, the apparatus for identifying a smoke event in an electron beam melting installation comprises a current measuring device and an evaluation unit. The current measuring device is configured for detecting a grounding current, and the evaluation unit is configured for identifying a smoke event by evaluating the grounding current detected by the current measuring device. Since the electron beam constitutes a current, the latter must ultimately also be carried away again via a grounding of the electron beam melting installation.

It has been found that smoke events are accompanied by a characteristic alteration of the grounding current and the evaluation unit can therefore identify a smoke event on the basis of these alterations in the grounding current. If the grounding current falls below a threshold value, for example, then the evaluation unit can identify a smoke event. Likewise, the evaluation unit can detect a steep falling edge and/or a decrease of the grounding current to almost zero as a smoke event. The automated identification represents a considerable advantage over the presently required optical checks by the operator of the installation and makes it possible to deal with smoke events in an automated manner.

In some embodiments, the evaluation unit is configured for evaluating a time profile of the grounding current. In this case, the time profile is selected for identifying a smoke event. First indications of a smoke event can be identified in the time profile. This may be expressed for example by an unexpected alteration of the gradient of the current, for example a reduction of the current. Taking account of the time profile of the grounding current makes it possible to consider the current more extensively and thus improves the identification accuracy of smoke events.

In some embodiments, the evaluation unit is configured for evaluating a frequency profile of the grounding current. A smoke event can be identified here for example by conspicuous features in the frequency profile of the grounding current. There is the possibility of allowing an FFT to progress over the time profile of the grounding current, which makes such an evaluation possible.

In some embodiments, the evaluation unit is configured for identifying a smoke event depending on an electron beam current. If the electron beam current is then also evaluated in addition to the grounding current, discrepancies between supplied current and derived current can be identified and, if appropriate, be assigned to a smoke event if the discrepancies become too large. In this case, both a profile of the grounding current and a profile of the electron beam current can be evaluated and compared with one another. Likewise, a difference between present grounding current and present electron beam current can be formed, which difference can be evaluated and/or serve as a control difference as a basis for closed-loop control of the electron beam current. The electron beam current can be measured in the electron beam source or, if the latter can be controlled, it is possible to use just the desired value of the electron beam current without measurement for a comparison.

In some embodiments, the current measuring device is configured for detecting the grounding current with a sampling frequency of at least 1 kHz. In some embodiments, the current measuring device is configured for detecting the grounding current with a sampling frequency of at least 10, 20 or 50 kHz. This enables particularly accurate analysis of the grounding current and also enables a sufficient reaction time with regard to the very high beam velocity and thus processing speed in electron beam installations.

In some embodiments, the evaluation unit comprises at least one trained artificial neural network. In this case, the neural network receives the grounding current or the grounding current signal and optionally the electron beam current or the electron beam current signal as input variable, evaluates these variables and outputs the occurrence of a smoke event as output variable. In this case, the neural network can likewise evaluate profiles of the grounding current and/or of the electron beam current and/or their frequency characteristic curves as input variable. In this case, an electron beam installation with an apparatus incorporating the teachings herein can serve for training the neural network, wherein e.g. a manual input or a confirmation of the automatically detected smoke events in the input variables is used for categorizing the data or for labeling the data.

As output variable, the neural network can output a binary variable that indicates a smoke event. It is alternatively or supplementarily possible for the neural network to output a probability for the occurrence of a smoke event, on the basis of which probability a further procedure, for example reducing the electron beam current, can be carried out. For network training or learning, supervised learning and unsupervised learning are suitable depending on how many labeled data (here: smoke events and associated current profiles) are available. Widely used open source solutions such as TensorFlow or Scikit-learn, for example, are suitable as implementation platforms.

In some embodiments, the current measuring device comprises a measuring resistor, which is safeguarded preferably by means of at least one overvoltage protection apparatus. The overvoltage protection can be embodied for example as a combination of gas discharge tubes (GDTs for short) with diodes. In this case, the diodes serve as an additional safety mechanism in order, in the event of a rapid buildup of voltage, to bridge the time until the gas discharge tube ignites.

In some embodiments, the current measuring device is configured for detecting the grounding current on a grounding line. The powder bed and/or the build plate of the electron beam melting installation are/is usually grounded. In this case, the grounding line can be extended for current detection. A measuring resistor can be used in this case. In some embodiments, the current on a central grounding line is measured since otherwise current division effects have to be taken into account. By way of example, Hall effect transducers, fluxgate transducers and/or galvanically isolated current transformers can be used as current measuring device. These have the advantage that they can be arranged around the grounding line without requiring an additional branch junction or an inserted current measuring resistor.

Some embodiments comprise an electron beam melting installation comprising an apparatus incorporating teachings of the present disclosure for identifying a smoke event. In this case, the electron beam melting installation comprises an electron beam source, which, by means of an accelerating voltage, accelerates an electron beam to a very high velocity (for example half the velocity of light) and controls said electron beam such that a component is built up layer by layer in the powder bed. In this case, the electron beam selectively melts the powder situated in the powder bed. Integration of the apparatus into the installation itself has the major advantage that not only is it possible to carry out monitoring measures, but it is also possible to carry out active countermeasures upon a smoke event being identified, without further detours.

In some embodiments, the electron beam melting installation comprises a controller. In this case, the controller is configured for controlling an electron beam source. Upon a smoke event being identified, the controller can e.g. switch off the electron beam source.

In some embodiments, the electron beam melting installation comprises a controller configured for controlling the electron beam source such that the smoke event is prevented, reduced with regard to intensity and/or ended. This can be accompanied by an alteration of the accelerating voltage and/or the electron beam current.

In some embodiments, the apparatus is arranged within a grounded housing of the electron beam melting installation. This has the advantage that for measurement purposes there is no need to provide safety measures over and above the safety measures of the installation that are present anyway. Furthermore, the measurement data or identified smoke events can be forwarded directly to a controller of the installation by the evaluation unit. It is likewise conceivable for the controller of the installation itself directly to effect the evaluation of the current measurement values, that is to say for the controller to integrate the function of the evaluation unit.

Some embodiments include a method for operating an electron beam melting installation. In this case, a component is produced in a powder bed by means of an electron beam. In this case, the method comprises evaluating a grounding current for identifying a smoke event and reducing an electron beam current upon an upcoming and/or existing smoke event being identified.

FIG. 1 schematically shows an example electron beam melting installation 10 incorporating teaching of the present disclosure, in which a component 1 is currently being built up layer by layer in a powder bed 130. For this purpose, the electron beam melting installation 10 comprises a process chamber 110, in which a build plate 140 is arranged within the powder bed 130. An electron beam source 120 generates an electron beam 125, which melts the powder present in the powder bed 130 layer by layer and thus produces the component 1 layer by layer.

In this case, the electron beam 125 has an electron beam current IB. In this case, the build plate 140 is grounded via a ground GND by means of a grounding line 145. In this case, the ground GND is likewise linked to the housing 180 of the electron beam melting installation 10. The grounding line 145 has a current measuring device 150, which detects the current IG flowing from the build plate 140 or out of the powder bed 130 via the grounding line 145 toward the ground GND, and/or the associated grounding current signal.

The grounding current IG is finally evaluated by an evaluation unit 160. Said evaluation unit 160 can evaluate both individual current values and time signals. A controller 170 controls the electron beam source 120 in this case and can have recourse in this case to the evaluation made available by the evaluation unit 160 regarding the presence of a smoke event. In this case, the evaluation unit 160 and the controller 170 are only depicted schematically within the housing. They may not necessarily lie within the closed structural chamber, or indeed 170 lies definitively outside, since the switchgear cabinet has similar dimensions to the structural space.

Figure 2:
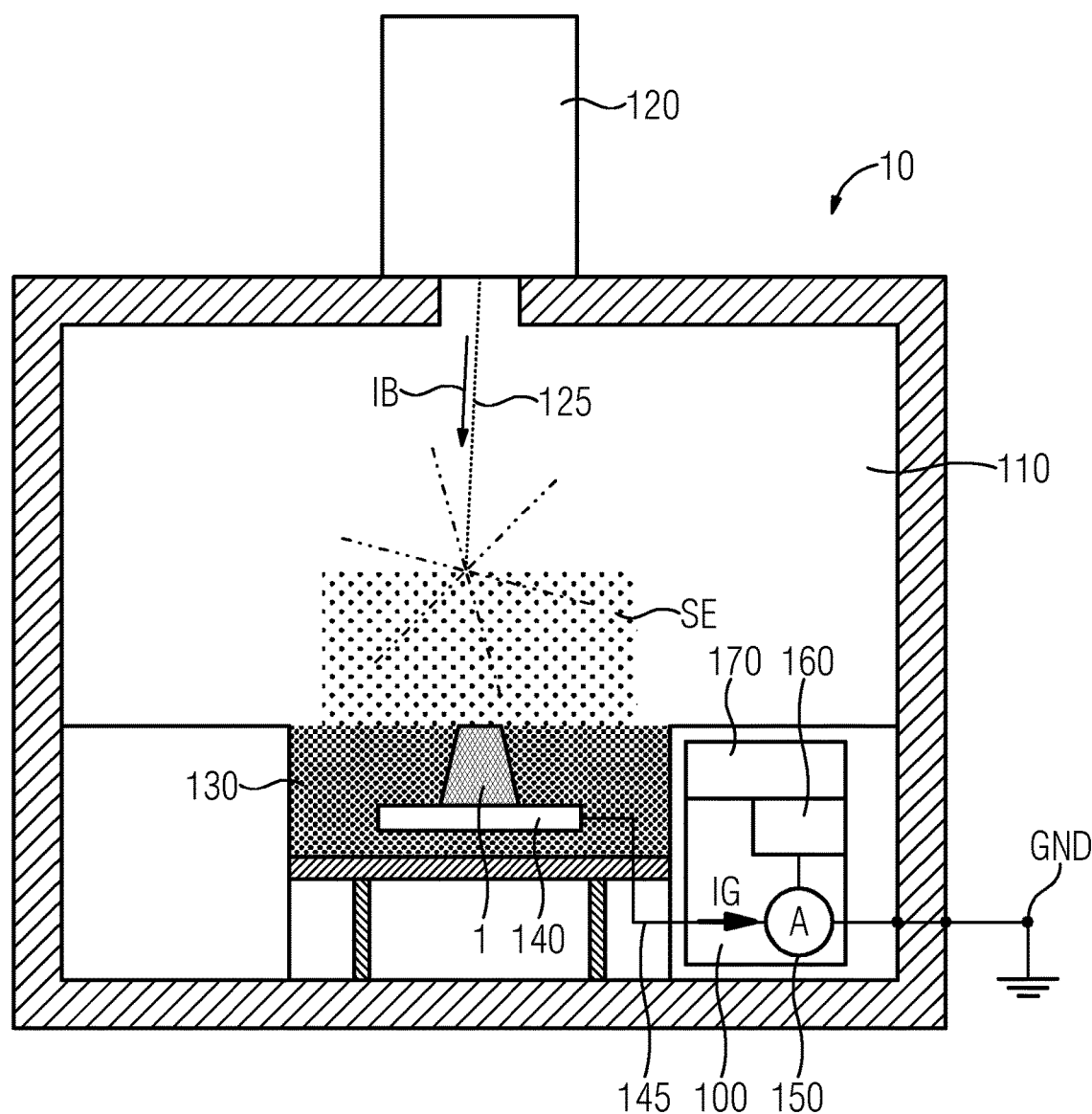
FIG. 2 shows a smoke event in the electron beam melting installation.

FIG. 2 shows the installation 10 from FIG. 1, wherein here a smoke event SE is present in the process chamber 110. It is evident that particles distributed finely above the powder bed 130 in the process chamber 110 can be seen as a smoke event SE. In this case, the electron beam 125 collides with a critical number of particles, is thereby deflected and/or scattered and/or reflected and, accordingly, no longer reaches the component 1 with the envisaged energy and trajectory. This has the consequence that the powder layer that is currently Lo be melted is not melt at all or is only melted incompletely.

In this case, the grounding current IG changes such that the evaluation unit 160 identifies the presence of the smoke event SE. The controller 170 can thus set the electron beam 125 and/or the electron beam current IB in order to end the smoke event. In this case, it may be necessary for the electron beam 125 to be completely deactivated. In some embodiments, the evaluation unit 160 already identifies the first indications of a smoke event SE (e.g. a change in the grounding current or an excessively increasing difference between grounding current IG and electron beam current IB) and controls the electron beam 125 accordingly, e.g. by reducing the current of the electron beam 125 or briefly deflecting the electron beam 125 into a zone in which the particles are not electrically charged to such a great extent.

After the controller 170 has implemented measures and the particles have settled again, a new powder layer can be applied and/or the powder bed can be subjected to blade spreading a number of times. The controller can then continue with the planned completion of the component 1.

In some embodiments, with regard to the interference immunity of the apparatus 100 if the grounding line 145, which grounds the powder bed 130 or the build plate 140 in the process chamber 110, comprises an insulation woven from very heat-resistant material, e.g. glass fibers, said insulation being particularly thermally stable. Furthermore, for the interference immunity it is advantageous, if peripheral devices, e.g. thermocouples, are used, for these to be grounded and for the grounding to be combined with the grounding line 145 in order to prevent currents from being grounded in some other way.

REFERENCE SIGNS

1 Component
10 Electron beam melting installation
100 Apparatus
110 Process chamber
120 Electron beam source
125 Electron beam
130 Powder bed
140 Build plate
145 Grounding line
150 Current measuring device
160 Evaluation unit
170 Controller of the EBM installation
180 grounded housing
IG Grounding current
IB Electron beam current

The invention claimed is:

1. An apparatus for identifying a smoke event in an electron beam melting installation, the apparatus comprising:
   a current meter measuring a grounding current; and
   a processor programmed to identify smoke events by evaluating a frequency profile of the grounding current.

2. The apparatus as claimed in claim 1, wherein the processor is further programmed to evaluate a time profile of the grounding current to identify smoke events.

3. The apparatus as claimed in claim 1, wherein the processor is further programmed to identify smoke events based at least in part on an electron beam current.

4. The apparatus as claimed in claim 1, wherein the current meter measures the grounding current with a sampling frequency of at least one kHz.

5. The apparatus as claimed in claim 1, wherein the processor comprises an artificial neural network trained to evaluate the grounding current and the electron beam current as input variables and identifies an occurrence of a smoke event as an output variable.

6. The apparatus as claimed in claim 1, wherein the current meter comprises a measuring resistor safeguarded by at least one overvoltage protection apparatus.

7. The apparatus as claimed in claim 1, wherein the current meter detects the grounding current on a grounding line.

8. An electron beam melting installation comprising:
- an electron beam source;
- a current meter measuring a grounding current; and
- a processor programmed to identify smoke events by evaluating a frequency profile of the grounding current.

9. The electron beam melting installation as claimed in claim 8, further comprising a controller configured for controlling the electron beam source on the basis of an identified smoke event.

10. The electron beam melting installation as claimed in claim 9, wherein the controller is configured for controlling the electron beam source to prevent and/or end the smoke event.

11. The electron beam melting installation as claimed in claim 8, further comprising a grounded housing;
- wherein the apparatus is arranged within the grounded housing.

12. A method for operating an electron beam melting installation, the method comprising:
- producing a component in a powder bed using an electron beam;
- evaluating a frequency profile of a grounding current for identifying smoke events; and
- reducing an electron beam current in response to identification of an upcoming and/or existing smoke event.

* * * * *